US007313119B2

(12) United States Patent
Suh et al.

(10) Patent No.: US 7,313,119 B2
(45) Date of Patent: Dec. 25, 2007

(54) SYSTEM AND METHOD FOR SUPPORTING MOBILITY OF MOBILE NODE USING REGIONAL ANCHOR POINT IN FUTURE INTERNET

(75) Inventors: Kyung-Joo Suh, Seoul (KR);
Young-Joo Suh, Pohang-shi (KR);
Dong-Hee Kwon, Pohang-shi (KR);
Kil-Seok Yang, Pohang-shi (KR);
Jae-Myung Jang, Pohang-shi (KR)

(73) Assignee: Samsung Electronics Co., Ltd. (KR)

( * ) Notice: Subject to any disclaimer, the term of this patent is extended or adjusted under 35 U.S.C. 154(b) by 865 days.

(21) Appl. No.: 10/636,136

(22) Filed: Aug. 6, 2003

(65) Prior Publication Data
US 2004/0105408 A1    Jun. 3, 2004

(30) Foreign Application Priority Data
Aug. 6, 2002    (KR)    ............... 10-2002-0046293

(51) Int. Cl.
*H04Q 7/24*    (2006.01)
*H04Q 7/00*    (2006.01)

(52) U.S. Cl. ............... 370/338; 370/331; 370/400

(58) Field of Classification Search ............ 370/338, 370/351, 331, 356, 349, 389, 400, 401; 709/238, 709/243, 249, 252; 455/436, 438, 439
See application file for complete search history.

(56) References Cited

U.S. PATENT DOCUMENTS 6,947,401 B2*    9/2005    El-Malki et al. ............ 370/331

6,999,437 B2*    2/2006    Krishnamurthi et al. .... 370/331
7,031,328 B2*    4/2006    Thubert et al. ............. 370/401
7,039,035 B2*    5/2006    Droms et al. ............... 370/338

(Continued)

FOREIGN PATENT DOCUMENTS

WO    WO 01/67798 A1    9/2001

OTHER PUBLICATIONS

International Search Report dated Dec. 19, 2003 issued in a counterpart application, namely, Appln. No. PCT/KR03/01571.

(Continued)

*Primary Examiner*—Sonny Trinh
(74) *Attorney, Agent, or Firm*—The Farrell Law Firm (57) ABSTRACT

A method for maintaining data transmission from a corresponding node when a mobile node moves from a first access router to a second access router in a network system, the method comprising: transmitting using the mobile node a home address of the mobile node and a one care-of address (CoA) assigned from the first access router to the corresponding node and a home agent, when the mobile node is located in the first access router; and transmitting using the mobile node the home address, the one CoA, and another CoA assigned from the second access router to the first access router so that data from the corresponding node is received via the first access router and the second access router, when the mobile node moves from the first access router to the second access router and the second access router is located within a predetermined distance from the first access router.

14 Claims, 8 Drawing Sheets

U.S. PATENT DOCUMENTS

| | | | |
|---|---|---|---|
| 7,130,614 B2 * | 10/2006 | Sreemanthula et al. | 455/411 |
| 7,149,225 B2 * | 12/2006 | Thubert et al. | 370/401 |
| 2001/0046223 A1 * | 11/2001 | Malki et al. | 370/338 |
| 2002/0159478 A1 | 10/2002 | Watanuki et al. | |
| 2002/0186679 A1 | 12/2002 | Nakatsugawa et al. | |
| 2003/0073452 A1 * | 4/2003 | Omae et al. | 455/466 |
| 2004/0049532 A1 * | 3/2004 | Oka et al. | 709/202 |
| 2004/0137888 A1 * | 7/2004 | Ohki | 455/417 |

OTHER PUBLICATIONS

Chang et al., "MPLS VPN in Cellular Mobile IPv6 Architectures", 2002 IEEE, pp. 337-341.

Chao et al., "The Implication of the Next-Generation Wireless Network Design: Cellular Mobile IPv6", 2000 IEEE, pp. 656-663.

Montavont et al., "Handover Management for Mobile Nodes in IPv6 Networks", 2002 IEEE, pp. 38-43.

* cited by examiner

FIG.1

(PRIOR ART)

SYSTEM AND METHOD FOR SUPPORTING MOBILITY OF MOBILE NODE USING REGIONAL ANCHOR POINT IN FUTURE INTERNET

PRIORITY

This application claims priority under 35 U.S.C. § 119 to an application entitled "System and Method for Supporting Mobility of Mobile Node Using Regional Anchor Point in Future Internet" filed in the Korean Intellectual Property Office on Aug. 6, 2002 and assigned Serial No. 2002-46293, the contents of which are incorporated herein by reference.

BACKGROUND OF THE INVENTION

1. Field of the Invention

The present invention relates generally to a system and method for managing mobility based on MIPv6 (Mobile Internet Protocol Version 6), and in particular, to a system and method for supporting regional mobility using access routers each having an anchor point function.

2. Description of the Related Art

Internet users desire to use a high-quality Internet service anytime and anyplace, and with the performance improvement of mobile terminals such as portable computers and PDAs (Personal Digital Assistants) and the development of wireless communication technology, the number of users has remarkably increased.

An IP (Internet Protocol) address in an Internet addressing system is comprised of a network identifier field and a host identifier field. The network identifier field is a part for identifying a network, while the host identifier field is a part for identifying a host within the network. If a mobile terminal moves to another network, the network identifier is changed and accordingly, an IP address of the mobile terminal is also changed. In an IP layer, since packets are routed according to a network identifier of a destination address, the mobile terminal cannot receive packets when it moves to another network. If a mobile terminal desires to continue communication even in another network, the mobile terminal should change its IP address so that it has a network identifier of the network each time it moves to another network. In this case, upper layer connection such as TCP (Transmission Control Protocol) connection is not guaranteed. Therefore, a protocol called "Mobile IP" capable of guaranteeing mobility is used to enable communication while maintaining an existing address intact.

If the number of wireless Internet users is increased, as is the current tendency, the increasing IP address demands cannot be satisfied with the existing IPv4 (Internet Protocol version 4) address system. Therefore, active searches have been carried out on a method for supporting mobility using a MIPv6 protocol that has recently attracted public attention as a future Internet protocol.

A fundamental operation of the MIPv6 will be described. If a mobile node (MN) moves from a home network to an external network, the mobile node acquires a care-of address (CoA) from an agent of a subnet where it is currently located. Also, when a mobile node moves from an external one subnet to a new subnet, the mobile node acquires a new CoA from the new subnet. The mobile node binds the CoA with a home address and registers the binding result in corresponding nodes (CNs) with which a home agent of the home network and the mobile node itself communicate. Thereafter, the corresponding nodes set a destination of a packet which is to be transmitted to the mobile node at the CoA, and transmit the packet to the mobile node. The home agent of the home network intercepts the packet being transmitted to the mobile node using the original home address as a destination address, and tunnels the intercepted packet to the mobile node.

If the mobile node is geographically or topologically remote from the home agent or the corresponding nodes, a time required for binding update is increased. During the binding update time, packets to be transmitted to the mobile node may be lost in an access router. A concept called "localized mobility management (LMM)" has been introduced as a scheme for solving this problem. LMM refers to a method in which even though a mobile node moves to a new subnet, a packet can be routed to the mobile node without affecting the binding registered in a home agent or the corresponding nodes. In this method, a mobile node can move to a new subnet while maintaining an IP address of the mobile node, as seen by the home agent of the mobile node and by the corresponding nodes.

Hierachical MIPv6 (HMIPv6) has been proposed as a conventional technique that satisfies the LMM condition. In HMIPv6, a new node called a "mobile anchor point (MAP)" is defined. The MAP is a router located in a domain visited by a mobile node, and can also be located in any layer among routers in a hierachical structure.

The MAP has a function of intercepting all packets to be delivered to a mobile node registered therein and directly tunneling the intercepted packets to a current CoA, or on-line CoA (LCoA), of the mobile node. The mobile node, when it moves to a new MAP domain, binding-registers a region or a regional CoA (RCoA), acquired from the new MAP, and its home address in the corresponding nodes or in the home agent. However, when the mobile node moves within the MAP domain, the mobile node binding-updates the RCoA and the LCoA only in the MAP without binding-updating them in the corresponding nodes or in the home agent.

Figure 1:
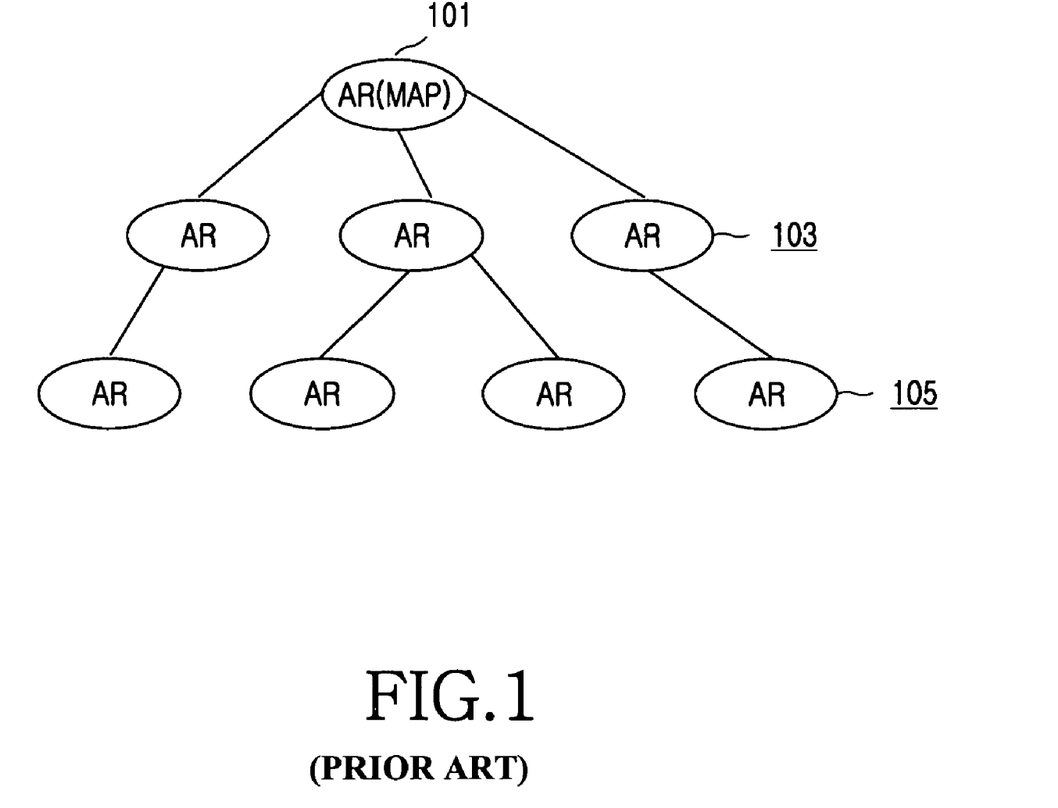
FIG. 1 illustrates an example of a conventional network topology with one MAP domain.

A boundary of the MAP domain is defined by access routers that advertise MAP information to connected mobile nodes. FIG. 1 illustrates an example of a conventional network topology with one MAP domain. Referring to FIG. 1, MAP 101 is connected to a plurality of access routers (ARs) 103, and each access router 103 is connected again to one or multiple access routers (ARs) 105. The access routers 105 advertise information on the MAP 101 to connected mobile nodes through a MAP optima message. With introduction of the MAP concept, a waiting time caused by handoff between two access routers is minimized. In addition, the MAP reduces signals that must be transmitted and received to/from the exterior of a regional domain in MIPv6, and smoothly performs handoff of a mobile node.

As described above, the MAP can be located in any layer among routers in a hierachical structure or access routers. However, once a position of the MAP is determined, only the access routers located in a lower layer of the MAP can use the MAP as anchor point. That is, the HMIPv6 can be undesirably realized only in a fixed hierachical network topology. Accordingly, there is a demand for a method capable of satisfying the LMM condition without restriction of the network topology like in the conventional HMIPv6.

In addition, in the hierachical network topology, when a mobile node is connected to an access router of a lower layer in a MAP domain, a length of a tunnel through which a packet transmitted to the access node is tunneled can become excessively long. An increase in tunnel length means that encapsulation and decapsulation of a packet transmitted to the mobile node must be repeated several times, causing an increase in a transmission time of a packet and a load of the routers that perform tunneling. Thus, there is a demand for an LMM realization method capable of restricting an excessive increase in tunnel length.

The HMIPv6 is divided into a basic mode and an extended mode according to a method in which a mobile node acquires RCoA. In the basic mode, RCoA is formed from (1) a subnet prefix of MAP broadcasted in a MAP option and (2) an interface identifier of a mobile node. In the extended mode, a mobile node receives RCoA assigned to any one of the interfaces of a MAP through a MAP option and uses the received RCoA intact. In either mode, the mobile node must acquire both LCoA and RCoA. Particularly, in order for the mobile node to acquire RCoA, a MAP option must be advertised from each router. Therefore, an RCoA acquisition procedure becomes a primary factor of increasing overhead in network operation. Thus, it is necessary to reduce the overhead caused by the RCoA acquisition procedure.

SUMMARY OF THE INVENTION

It is, therefore, an object of the present invention to provide an apparatus and method for realizing MIPv6 that satisfies an LMM condition without restriction of network topology.

It is another object of the present invention to provide an apparatus and method that uses an anchor point for preventing an excessive increase in a length of a tunnel through which a packet is tunneled in MIPv6.

It is further another object of the present invention to provide an apparatus and method that uses an anchor point for reducing overhead caused by an RCoA acquisition procedure in MIPv6.

To achieve the above and other objects, the invention provides a method for supporting mobility of a mobile node in the future Internet using the mobile node, which is a host for supporting a mobile service; a home agent for managing an address of the mobile node; and corresponding nodes in communication with the mobile node. The method comprises the steps of acquiring a care-of address (CoA) from a current access router where it is currently located; determining whether there is an access router capable of functioning as an anchor point among access routers where the mobile node was previously located; designating the access router capable of functioning as the anchor point as a regional anchor point (RAP); binding the CoA acquired in the RAP and the CoA from the current access router as a RAP address and a final CoA, respectively, and registering them in the RAP; and intercepting, using the RAP, packets being transmitted with the mobile node designated as a destination, and tunneling the packets to the final CoA of the mobile node.

To achieve the above and other objects, the invention provides a network system supporting mobility of a mobile node in a future Internet. The network system comprises a mobile node supporting a mobile service; a first access router for assigning a first CoA to the mobile node and transmitting a packet with the first CoA designated as a destination to the mobile node; a second access router with a first binding memory, for assigning a second CoA to the mobile node, registering the second CoA and the first CoA in the first binding memory as a regional CoA and a final CoA, respectively, intercepting a packet being transmitted to the mobile node with the regional CoA designated as a destination, and tunneling the packet data to the mobile node, when the mobile node is located in the first access router; and a corresponding node with a second binding memory, for registering a home address of the mobile node and the regional CoA in the second binding memory, designating the regional CoA as a destination of a packet, and transmitting the packet to the mobile node, when the mobile node is located in the first access router.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

The invention proposes a concept of regional MIPv6 (RMIPv6) that uses a regional anchor point (RAP), as MIPv6 that satisfies an LMM condition. The regional anchor point is an access router serving as an anchor point for a mobile node among access routers, and is distinguished from MAP used in HMIPv6.

If a mobile node moves to another access router, either a current access router or a previous access router is designated as a RAP. The RAP, including a binding cache, binds LCoA with RCoA of a mobile node and registers the binding result in the binding cache. Like in the HMIPv6, LCoA is a care-of address (CoA) indicating a current position of a mobile node, while RCoA is a CoA indicating an anchor point. The RAP intercepts a packet targeting the mobile node and tunnels the intercepted packet to the LCoA until a binding entry in the binding cache is cleared.

A MIPv6 realization method will now be described with reference to the accompanying drawings by applying the above concept.

Figure 2:
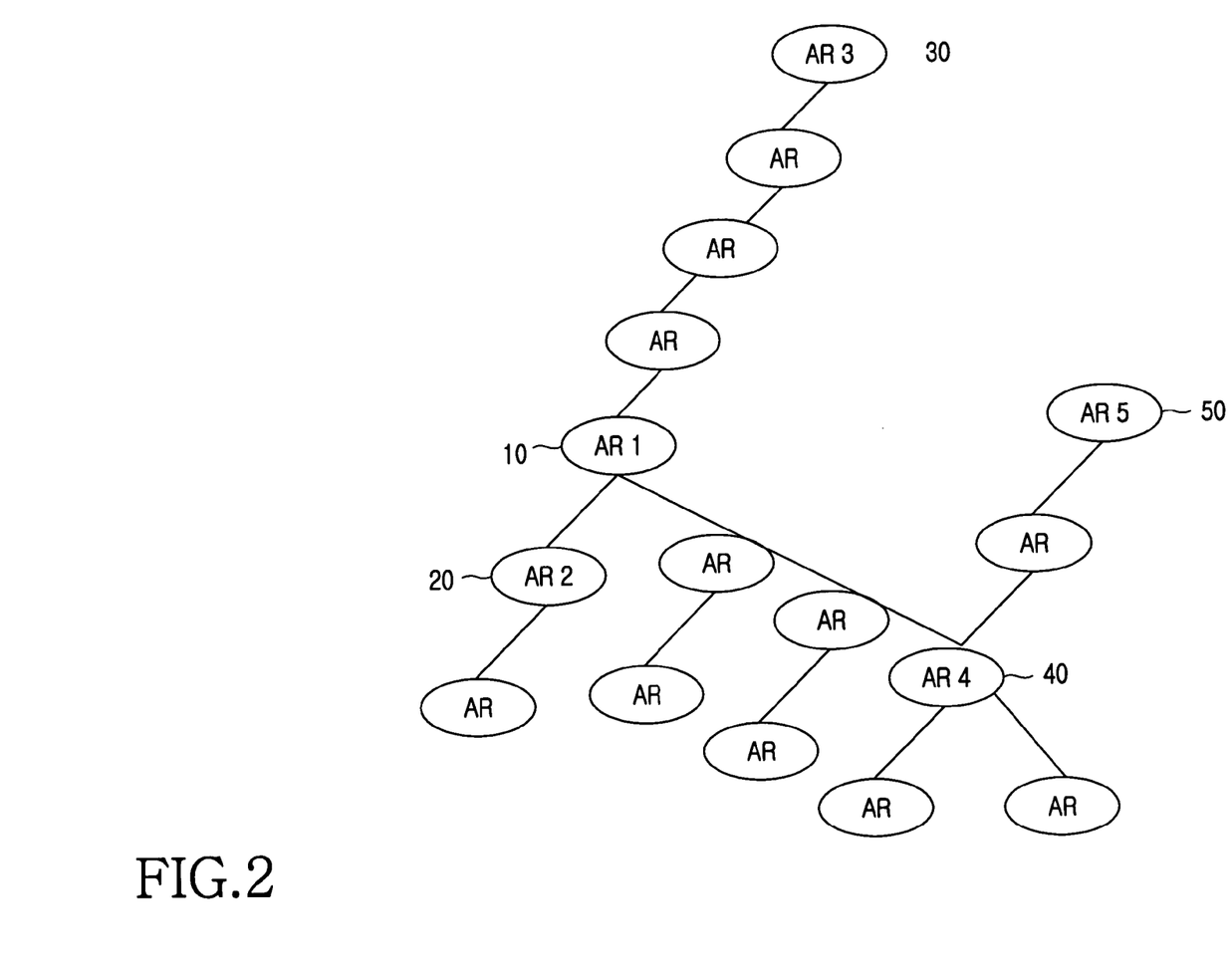
FIG. 2 illustrates a network topology according to an embodiment of the present invention.
Figure 3:
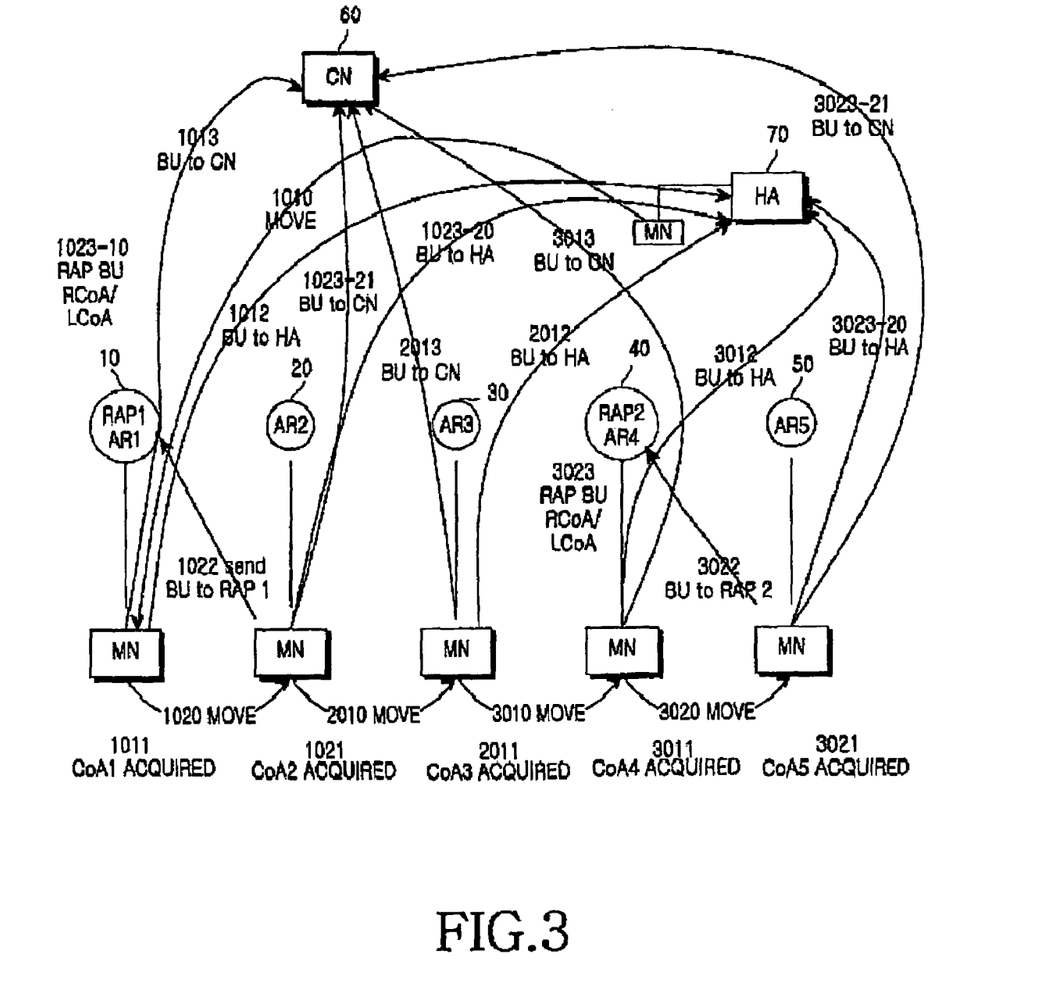
FIG. 3 illustrates a method for using MIPv6 in the network topology of FIG. 2 according to an embodiment of the present invention.

FIG. 2 illustrates a network topology according to an embodiment of the present invention. In the network topology, an AR1 (Access Network 1) 10 and an AR4 40 can serve as an anchor point, i.e., RAP. FIG. 3 illustrates a method for releasing MIPv6 on the assumption that in a network having the same topology as that of FIG. 2, a mobile node sequentially moves from an AR1 10 to an AR5 50.

In step 1010, a mobile node (MN) moves from a home agent (HA) 70 to the AR1 10 of an external network. The mobile node acquires CoA1 to be used in the AR1 10 upon receiving an agent advertisement from the AR1 10. Meanwhile, the mobile node determines whether the AR1 10 can operate as a RAP.

In step 1012, the mobile node sends a binding update (BU) to the home agent 70 with the CoA1. In step 1013, the mobile node sends the binding update to a corresponding node (CN) 60, with which the mobile node itself is communicating, with the CoA1. That is, the home agent 70 and the corresponding node 60 bind the CoA1 with a home address of the mobile node and register the binding result in their internal binding cache. The binding-updated corresponding node 60 directly transmits a packet targeting the mobile node to the CoA1. In addition, the home agent 70 intercepts a packet targeting a home address of the mobile node as a destination and directly tunnels the intercepted target to the CoA1 when the corresponding node 60 sends a packet to the mobile node.

In step 1020, the mobile node moves again to an AR2 20. In step 1021, the mobile node acquires CoA2 to be used in the AR2 20 upon receiving an agent advertisement from the AR2 20. In addition, the mobile node determines whether the AR1 10, a previous AR, provides a RAP function. At this point, the mobile node determines not only whether the AR1 10 has a RAP function but also whether the AR1 10 and the AR2 20 are located within a predetermined distance range. Herein, the distance range between the two ARs is limited, to prevent a tunneling length from becoming excessively long by using a farther AR as a RAP. Herein, a distance between two ARs is determined on the basis of a hop count, and a limitation of the distance range to an AR that can be used as a RAP is, for example, 3 hops. However, it should be noted that an actual distance between two routers and other methods can also be used. In the network topology of FIG. 2, since the AR1 10 has a RAP function and a distance between the AR1 10 and the AR2 20 is 1 hop, the mobile node at the AR2 20 can use the AR1 10 as a RAP. Here, the AR1 10 is represented by RAP1 in order to distinguish it from other ARs having a RAP function.

Meanwhile, it should be noted that in a preferred embodiment of the present invention, the mobile node located in the AR2 can be realized so that it operates using a method defined in the conventional MIPv6 without using the MIPv6 proposed in the invention even though the AR1 provides a RAP function.

In step 1022, the mobile node designates CoA1 as RCoA and CoA2 as LCoA, and registers them in the RAP1. That is, CoA1 acquired by the mobile node from the RAP1 is used as RCoA for the mobile node within the RAP1 domain. Meanwhile, the mobile node determines whether the AR2 20 can operate as a RAP. In step 1023-10, the AR1 10 operating as the RAP1 performs a binding update on CoA1 and CoA2 as RCoA and LCoA, respectively, for a mobile node, and transmits a binding acknowledgement (BA) to the mobile node. As a result, the AR1 10 operates as a RAP for a mobile node.

However, upon failure to receive a binding acknowledgement BA from the AR1 10, the mobile node operates in a manner defined in MIPv6. In steps 1023-20 and 1023-21, the mobile node sends a binding update BU to the home agent 70 (1023-20) and the corresponding node 60 (1023-21) by using CoA2 as CoA. If the mobile node receives a binding acknowledgement BA including a deny code for denying the binding update BU from the AR1 10, or fails to succeed in the other binding update BU, the mobile node performs the steps 1023-20 and 1023-21. The deny code follows the MIPv6 specification.

In step 2010, the mobile node moves again to an AR3 30. In step 2011, the mobile node acquires CoA3 to be used in the AR3 30 upon receiving an agent advertisement from the AR3 30, and then determines whether it can use the AR1 10 as a RAP. In the network topology of FIG. 2, the AR1 10 is at a 4-hop distance from the AR3 30, exceeding the distance range, so that the mobile node located in the AR3 30 cannot use the AR1 10 as a RAP. Since the mobile node fails to be supported with the RAP function, it operates in a manner defined in the conventional MIPv6. Therefore, in steps 2012 and 2013, the mobile node binding-registers CoA3 and its own home address in the home agent 70 (2012) and the corresponding node 60 (2013) by using CoA3 as CoA. Meanwhile, the mobile node determines whether a RAP function exists in the AR3 30.

In step 3010, the mobile node moves again from the AR3 30 to the AR4 40. The mobile node acquires CoA4 to be used in the AR4 upon receiving an agent advertisement from the AR4 40, and then determines whether it can use the AR3 30 as a RAP. Here, since no RAP function exists in the AR3 30, the mobile node cannot use the AR3 30 as a RAP. Therefore, in steps 3012 and 3013, the mobile node designates CoA4 as CoA, and transmits a binding update BU to the home agent 70 (3012) and the corresponding node 60 (3013). Meanwhile, the mobile node determines whether a RAP function exists in the AR4 40.

In step 3020, the mobile node moves to the AR5 50. In step 3021, the mobile node acquires CoA5 to be used in the AR5 50, and determines whether it can use the AR4 40, a previous AR, as a RAP. In FIG. 2, since a RAP function exists in the AR4 40 and the AR4 40 is at a 2-hop distance from the AR5 50, the mobile node located in the AR5 50 can use the AR4 40 as a RAP. Herein, the AR4 40 is represented by RAP2 in order to distinguish it from the RAP1.

In step 3022, the mobile node designates CoA4 as RCoA and CoA5 as LCoA, and registers them in the RAP2. Meanwhile, the mobile node determines whether the AR5 50 can operate as a RAP. In step 3023, the AR4 40 operating as a RAP performs binding update on CoA4 and CoA5 with the RCoA and the LCoA for a mobile node, and thereafter, transmits a binding acknowledgement BA to the mobile node. Thus, the AR4 40 operates as a RAP for a mobile node.

However, when the mobile node fails to receive the binding acknowledgement BA from the AR4 40, the mobile node operates in a manner defined in MIPv6. That is, in steps 3023-20 and 3023-21, the mobile node sends a binding update BU to the home agent 70 (3023-20) and the corresponding node 60 (3023-21) by using CoA5 as CoA.

A concept of the MIPv6 using a RAP has been described so far with reference to FIGS. 2 and 3. Compared with the conventional HMIPv6, the MIPv6 proposed by the present invention has the following advantages. First, the MIPv6 realizes a RAP irrespective of a network topology layer, thereby satisfying an LMM condition without restriction of a network topology, unlike the conventional HMIPv6. Second, the MIPv6 uses only an AR located within a predetermined distance range, thereby preventing an excessive increase in tunnel length. Third, the MIPv6 uses CoA acquired in a previous AR as RcoA, thereby removing overhead caused by acquisition of RCoA.

Shown in Table 1 below are binding entries registered in binding caches of the access routers, the home agent (HA) 70 and the corresponding node (CN) 60 according to a position of a mobile node when the mobile node is sequentially handed off between the access routers in the order shown in FIG. 3.

TABLE 1

| MN Position | HA/CN | AR1(RAP1) (LCoA:RCoA) | AR2 | AR3 | AR4(RAP2) (LCoA:RCoA) | AR5 |
|---|---|---|---|---|---|---|
| AR1 | MN:CoA1 | — | — | — | — | — |
| AR2 | MN:CoA1 | CoA2:CoA1:MN | — | — | — | — |
| AR3 | MN:CoA3 | — | — | — | — | — |
| AR4 | MN:CoA4 | — | — | — | — | — |
| AR5 | MN:CoA4 | — | — | — | CoA5:CoA4:MN | — |

Figure 4:
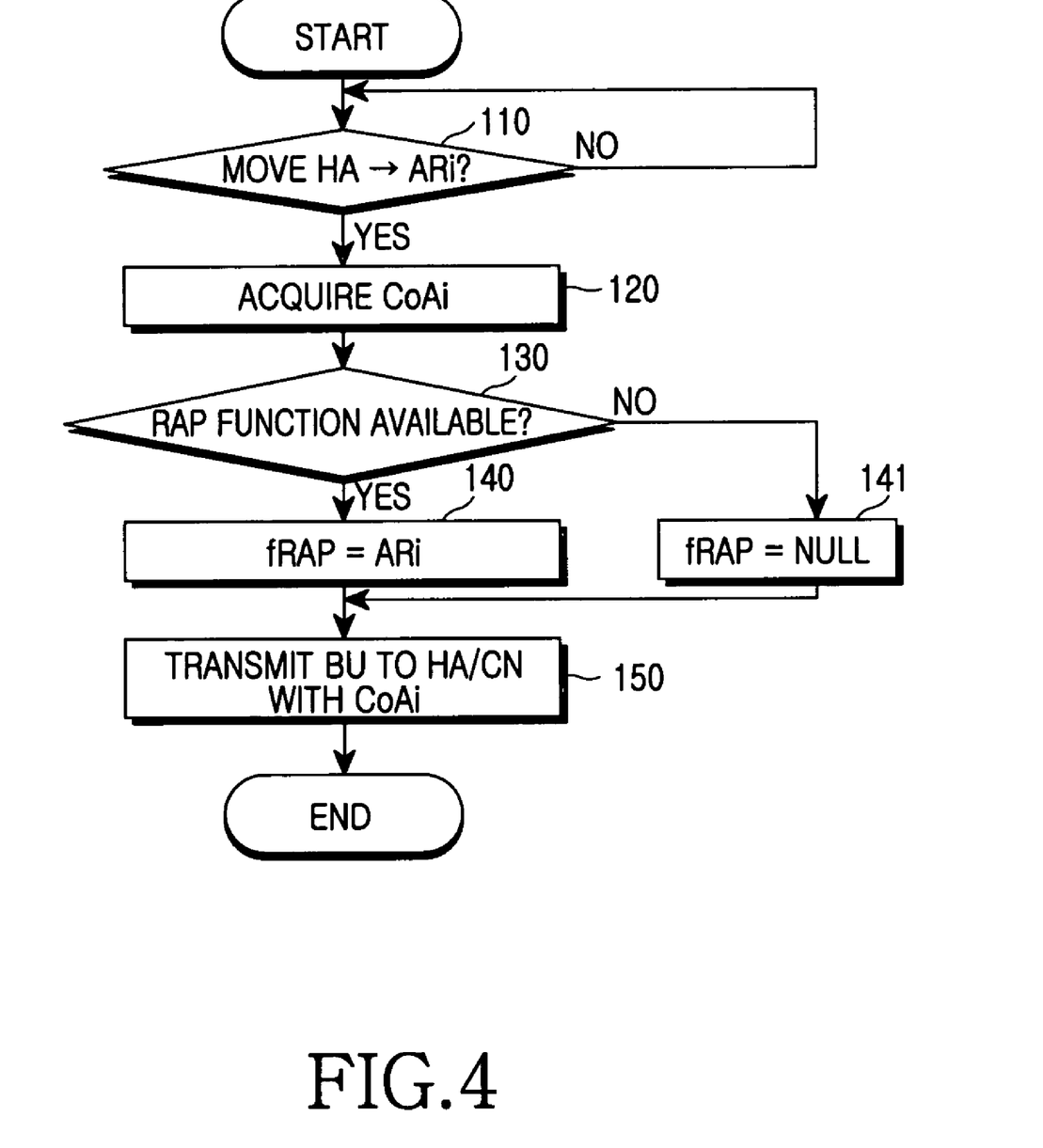
FIG. 4 is a flowchart illustrating a procedure performed in a mobile node when the mobile node first moves from a home network to an external network according to an embodiment of the present invention.
Figure 5:
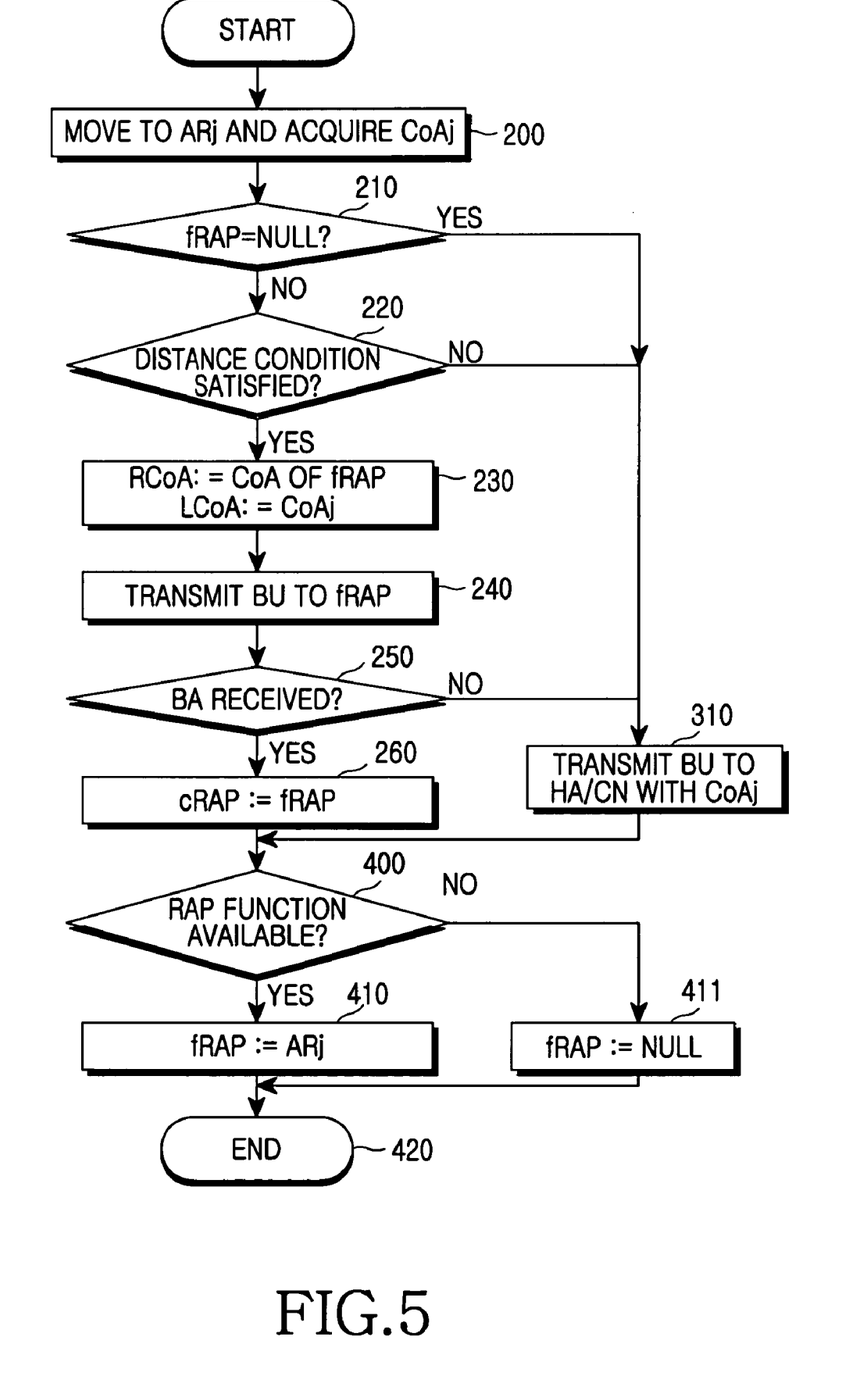
FIG. 5 is a flowchart illustrating a procedure in which a mobile node performing a second handoff first sets up a RAP.
Figure 6:
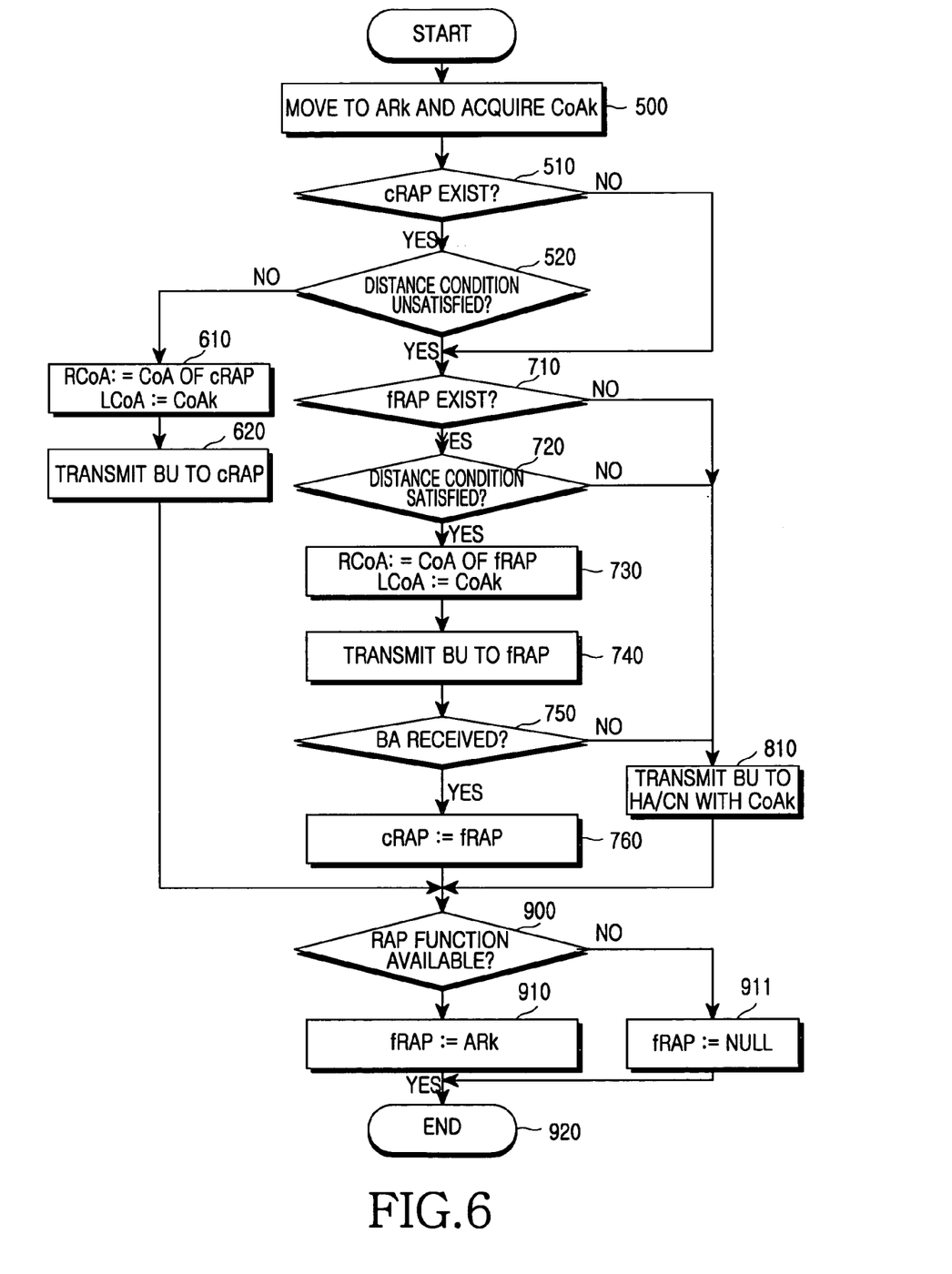
FIG. 6 is a flowchart illustrating a procedure performed in a mobile node when the mobile node performs third or later handoff according to an embodiment of the present invention.

FIGS. 4 to 6 illustrate detailed procedures performed in a mobile node to realize RMIPv6 according to a preferred embodiment of the present invention. Specifically, FIG. 4 is a flowchart illustrating a procedure performed in a mobile node when the mobile node first moves from a home network to an access router on an external network ARi, and FIG. 5 is a flowchart illustrating a procedure in which a mobile node performing a second handoff first sets up a RAP. Further, FIG. 6 is a flowchart illustrating a procedure performed in a mobile node when the mobile node performs a third or later handoff. The drawings are separated according to moving order of the mobile node for the convenience of explanation.

With reference to FIG. 4, a description will now be made of a procedure for first finding a RAP using a mobile node when the mobile node first moves from a home network to an access router on an external network ARi.

In step 110, the mobile node determines whether it has moved from a home network to an access router on an external network ARi. That is, the mobile node determines whether it has moved from the home agent to an external access router ARi. If the mobile node has moved to the external access router ARi, the mobile node acquires CoAi from a current access router ARi in step 120. Here, CoAi can be acquired in a common stateful method or stateless method.

In step 130, the mobile node determines whether a RAP function exists in the access router ARi. If the ARi has a RAP function, the mobile node designates the ARi as fRAP in step 140. However, if no RAP function exists in the ARi, the mobile node designates fRAP as null in step 141. Here, the fRAP is a parameter for indicating whether an immediately previous access router ARi can be used as a RAP when the mobile node moves to another access router, and the mobile node manages the fRAP by allocating a specific area of a memory.

In step 150, the mobile node requests the home agent and the corresponding node to binding-update a current CoAi and its own home address, and then ends the RAP setting.

With reference to FIG. 5, a description will now be made of a procedure performed in a mobile node when the mobile node performs a second handoff, i.e., moves to an ARj.

In step 200, the mobile node is handed off to an access router on an external network ARj and acquires CoAj from the current access router on the external network ARj, or the current external access router. In step 210, the mobile node determines whether fRAP, i.e. a previous access router providing a RAP function, exists. If fRAP exists, the mobile node determines in step 220 whether a distance between the previous access router fRAP and the current access router ARj falls within a predetermined range. This is to prevent an excessive increase in tunnel length because of the excessively long distance between the RAP and the current mobile node.

If a distance condition of the fRAP is satisfied, the mobile node designates the CoA and the CoAj acquired in the fRAP as RCoA and LCoA, respectively, in step 230. The mobile node binding-updates the designated RCoA and LCoA in the fRAP in step 240, and then determines in step 250 whether a binding acknowledgement BA is received from the fRAP. If the BA is received, the fRAP starts providing a RAP function for the mobile node. Therefore, in step 260, the mobile node designates the fRAP as cRAP in order to designate the fRAP as a current anchor point, and then proceeds to step 400. The cRAP, like the fRAP, is a parameter managed by the mobile node by allocating a specific area of a memory.

In step 400, the mobile node determines whether the current access router ARj can operate as the next access router RAP. This is to determine whether the current access router ARj can be used as an anchor point when the next access router cannot use a current anchor point cRAP, i.e. a current access router providing a RAP function. As a result of the determination in step 400, if a RAP function exists in the ARj, the mobile node designates the ARj as fRAP in step 410, and ends the RAP setting procedure in step 420. However, if no RAP function exists in the ARj, the mobile node sets the fRAP to null in step 411.

Meanwhile, if the fRAP is null in step 210, i.e., if no RAP function exists in a previous access router, or if it is determined in step 220 that even though a RAP function exists in the previous access router a distance between the previous access router having the RAP function and the current access router ARj is too far, then the mobile node cannot be provided with a RAP function from the previous access router. In addition, even when no BA is received from the fRAP in step 250, the mobile node cannot be provided with a RAP function from the previous access router. In this case, the mobile node proceeds to step 310 where it transmits a binding update BU to the home agent and the corresponding node with the CoAj and operates in a method defined in the conventional MIPv6.

Next, with reference to FIG. 6, a description will be made of an operation performed when a mobile node performs a third handoff, i.e., moves to ARk.

In step 500, the mobile node moves to another external network, and acquires CoAk from an access router ARk of the external network. In step 510, the mobile node determines whether cRAP, i.e., a current anchor point, exists. If the cRAP exists, the mobile node determines in step 520 whether a distance between the cRAP and the current access router ARk falls within a predetermined range. This is to prevent an excessive increase in a tunnel length because of the excessively long distance between the cRAP and the current mobile node.

As a result of the determination in step 520, if a distance condition of the cRAP is satisfied, the mobile node designates the CoA and the CoAk acquired in the cRAP as RCoA and LCoA, respectively, in step 610. In step 620, the mobile node binding-updates the designated RCoA and LCoA in the cRAP, and then proceeds to step 900.

However, as a result of the determination in step 520, if the cRAP does not exist or the distance condition is not satisfied, the mobile node determines in step 710 whether a previous access router can be used as an anchor point. That is, it is determined whether fRAP exists. If fRAP exists as illustrated in FIG. 5, the mobile node determines in step 720 whether a distance between the fRAP and the current access router ARk falls within a predetermined range. As a result of the determination, if the fRAP satisfies a distance condition, the mobile node designates the CoA and the CoAk acquired in the fRAP as RCoA and LCoA, respectively, in step 730. The mobile node binding-updates the designated RCoA and LCoA in the fRAP in step 740, and determines in step 750 whether a response BA for the binding update is received from the fRAP. If the BA is received, the fRAP starts providing a RAP function for the mobile node. Therefore, in step 760, the mobile node designates the fRAP as a new cRAP, and then proceeds to step 900. At this moment, since binding registration of a previous cRAP must be released, the mobile node sets a lifetime field of a binding update message to '0', and then transmits the binding update message to the previous cRAP.

In step 900, the mobile node determines whether the current access router ARk can operate as a RAP in the next access router. As a result of the determination, if a RAP function exists in the ARk, the mobile node designates fRAP as ARk in step 910, and then ends the RAP setting procedure in step 920. However, if no RAP function exists in the ARk, the mobile node designates the fRAP as null in step 911.

Meanwhile, if the fRAP is null in step 710, i.e., if no RAP function exists in a previous access router, or if it is determined in step 720 that even though a RAP function exists in the previous access router, a distance between the previous access router having the RAP function and the current access router ARk is too far, then the mobile node cannot be provided with a RAP function from the previous access router. In addition, even when no BA is received from the fRAP in step 750, the mobile node cannot be provided with a RAP function from the previous access router. In this case, the mobile node proceeds to step 810 where it transmits a binding update BU to the home agent and the corresponding node with the CoAk. At this moment, the mobile node sets a lifetime field of a binding update message to '0', and then transmits the binding update message to the cRAP thereby to release the binding registered in the cRAP. However, it is determined in step 510 that cRAP does not exist, it is not necessary to cancel registration in the cRAP.

Figure 7:
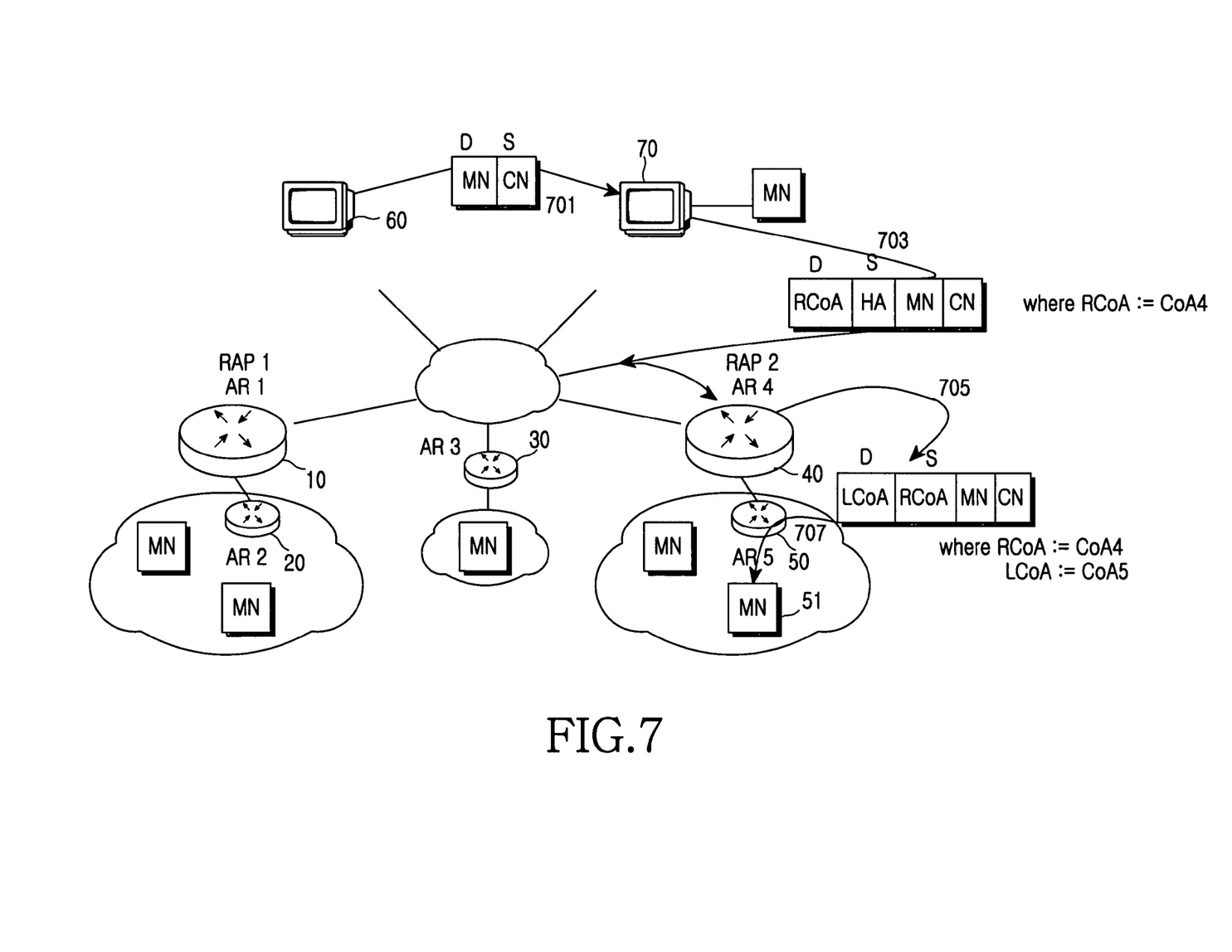
FIG. 7 illustrates packet transmission flow before route optimization is performed according to an embodiment of the present invention.

FIG. 7 illustrates packet transmission flow to a mobile node 51 connected to an AR5 50 in a MIPv6-based network built as described in conjunction with FIG. 3 according to an embodiment of the present invention. Particularly, FIG. 7 illustrates packet flow from a corresponding node 60 to the mobile node 51 before route optimization is performed. That is, in the packet flow of FIG. 7, binding for the mobile node 51 is not set up yet in the corresponding node 60 and a packet for the mobile node 51 is transmitted via a home agent 70.

In step 701, the corresponding node 60 desiring to transmit a packet to the mobile node 51 designates a source and a destination of a packet header as the corresponding node 60 and the mobile node 51, respectively, and then transmits the packet to the mobile node 51. In step 703, the home agent 70 intercepts the transmitted packet having the mobile node 51 managed by the home agent itself as its destination. The home agent 70 encapsulates an external header of the packet with the home agent 70 designated as a source and RCoA designated as a destination, and transmits the packet to a RAP2 40. The RCoA is CoA4 which is CoA of the RAP2 40, previously binding-registered in the home agent 70 together with a home address of the mobile node 51 at the request of the mobile node 51, when the mobile node 51 moves to the AR4 which is the RAP2 40.

In step 705, the RAP2 40 receives the packet. The RAP2 40 removes an external header of the received packet, and encapsulates again a header with LCoA designated as a destination and RCoA designated as a source. Thereafter, in step 707, the packet is tunneled to the mobile node 51 via the AR5 50 connected thereto. Here, the LCoA and RCoA are binding-updated in the RAP2 40 when the mobile node 51 moves to the AR5 50.

Figure 8:
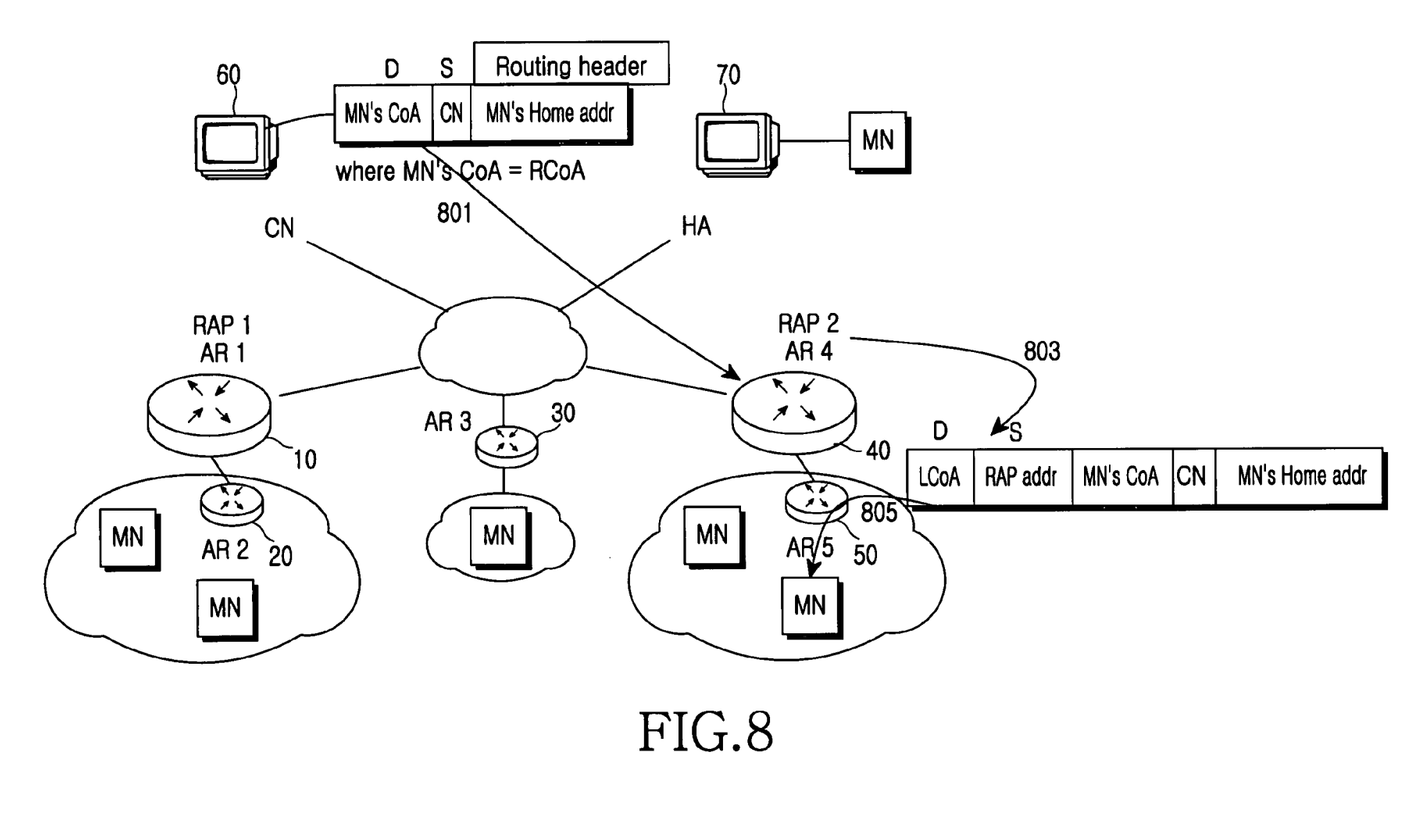
FIG. 8 illustrates packet transmission flow after route optimization is performed according to an embodiment of the present invention.

FIG. 8 illustrates packet flow transmitted from a corresponding node 60 to a mobile node 51 after route optimization for the corresponding node 60 is completed.

In step 801, the corresponding node 60 designates the corresponding node 60 as a source of a packet header and CoA of the mobile node 51 as a destination of the packet header, attaches a home address of the mobile node 51 to a routing header, and transmits the packet to the mobile node 51. Here, CoA of the mobile node 51 designated as a destination is current RCoA of the mobile node 51, i.e., CoA4 binding-updated in the corresponding node 60 together with a home address of the mobile node 51 when the mobile node 51 moves to the RAP2 40. In step 803, the RAP2 40 intercepts the packet, and designates LCoA of the mobile node 51 as a destination of the packet header and an address of RAP as a source of the packet header. Here, the LCoA is CoA5 acquired from the AR5 50 where the mobile node 51 is currently located, while the RCoA is CoA4 acquired from the RAP2 40. Unlike in FIG. 7, after route optimization, a packet from the corresponding node 60 does not pass through the home agent 70. Finally, in step 805, the packet is tunneled again to the mobile node 51 via the AR5 50.

As described above, the invention can overcome fixation of a network topology, which is a shortcoming of HMIPv6, by realizing MIPv6 using an anchor point. In addition, the invention can prevent an excessive increase in tunnel length by using only an access router located within a predetermined distance range as an anchor point. Moreover, the invention uses CoA acquired from a previous access router as RCoA thereby removing overhead caused by acquisition of RCoA.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for supporting mobility of a mobile node in a network system including a home agent for managing an address of the mobile node and a plurality of access routers, the method comprising the steps of:

(a) acquiring by the mobile node a care-of address (CoA) from a first access router when the mobile node is located in the first access router;

(b) determining by the mobile node whether the first access router provides a regional anchor point (RAP) function; and (c) transmitting a CoA assigned from a second access router to the first access router by the mobile node that has moved from the first access router to the second access router, when the first access router has a RAP function.

2. The method of claim 1, wherein the step (b) comprises the step of determining whether the second access router is located within a predetermined distance from the first access router.

3. The method of claim 1, wherein step (a) comprises the steps of:
acquiring a CoA assigned from the first access router; and
transmitting a binding update having a home address and the CoA assigned from the first access router to the home agent.

4. The method of claim 3, further comprising the step of receiving by the mobile node a binding acknowledgement indicating success in binding update.

5. The method of claim 1, further comprising the step of, upon receiving the CoA assigned from the second access router, binding by the first access router the received CoA from the second access router with an address of the first access router.

6. The method of claim 5, wherein the CoA assigned from the first access router and the CoA assigned from the second access router are designated as an RAP address and a final CoA, respectively, and then registered in the RAP.

7. The method of claim 6, wherein the RAP intercepts packet data being transmitted with the mobile node designated as a destination, and tunnels the packet data to the final CoA of the mobile node.

8. The method of claim 1, further comprising the step of transmitting the CoA assigned from the second access router to the home agent by the mobile node, if the first access router does not provide a RAP function.

9. The method of claim 1, further comprising the step of transmitting the CoA assigned from the first access router to a corresponding node, if the mobile node is located in the first access router.

10. A method for maintaining data transmitted from a corresponding node when a mobile node moves from a home network to an external network in a network system including a home agent for managing an address of the mobile node and a plurality of access routers to which the mobile node can move, the method comprising the steps of:
acquiring a care-of address (CoA) assigned from the first access router when the mobile node first has moved from the home network to the external network;
determining whether the first access router has a regional anchor point (RAP) function; and
designating the first access router as a first RAP and transmitting a binding update having the CoA assigned from the first access router and a home address to the home agent, if the first access router has a RAP function.

11. The method of claim 10, further comprising the step of designating the first RAP as a null and transmitting a binding update having the CoA assigned from the first access router to the home agent, if the first access router does not have a RAP function.

12. An apparatus for supporting mobility of a mobile node moved from a second access router to a first access router in a network system including a home agent for managing an address of a mobile node and a plurality of access routers to which the mobile node can move, the apparatus comprising:
a first access router for assigning a first care-of address (CoA) to the mobile node;
a mobile node for determining whether a second access router has a regional anchor point (RAP) function and transmits a binding message including the first CoA to the second access router if the second access router has a RAP function; and
a second router for assigning a second CoA to a mobile station and binding the first CoA from the mobile node with the assigned second CoA upon receiving a binding message from the mobile node.

13. The apparatus of claim 12, further comprising a home network that binds, upon receiving a binding message from the mobile node, a CoA included in the received binding message with a home address, and upon receiving packet data from a corresponding node, transmits the received packet data to the bound address designated as a destination address.

14. The apparatus of claim 12, wherein the mobile node determines whether the second access router is located within a predetermined distance from the first access router in order to determine whether the second has a RAP function.

* * * * *